United States Patent [19]

DiGiovanni et al.

[11] Patent Number: 5,237,576
[45] Date of Patent: Aug. 17, 1993

[54] ARTICLE COMPRISING AN OPTICAL FIBER LASER

[75] Inventors: David J. DiGiovanni, Scotch Plains; Victor Mizrahi, Bedminster; John L. Zyskind, Shrewsbury, all of N.J.

[73] Assignee: AT&T Bell Laboratories, Murray Hill, N.J.

[21] Appl. No.: 878,791

[22] Filed: May 5, 1992

[51] Int. Cl.$^5$ .................................. H01S 3/30
[52] U.S. Cl. .......................... 372/6; 385/37; 372/66
[58] Field of Search .................. 372/6, 66; 385/37

[56] References Cited

U.S. PATENT DOCUMENTS

| | | |
|---|---|---|
| 4,093,338 | 6/1978 | Bjorklund et al. . |
| 4,666,247 | 5/1987 | MacChesney et al. . |
| 4,725,110 | 2/1988 | Glenn et al. . |
| 4,807,950 | 2/1989 | Glenn et al. . |
| 5,007,705 | 4/1991 | Morey et al. . |
| 5,042,897 | 8/1991 | Meltz et al. .......................... 385/37 |
| 5,042,898 | 8/1991 | Morey et al. ........................ 385/37 |
| 5,048,913 | 9/1991 | Glenn et al. ......................... 385/37 |
| 5,181,213 | 1/1993 | Shinokura et al. ................... 372/6 |

FOREIGN PATENT DOCUMENTS 0435217 7/1991 European Pat. Off. ............. 372/66

OTHER PUBLICATIONS

G. A. Ball and W. W. Morey, "Continuously tunable single-mode erbium fiber laser", *Optics Lett.* 17, 1992, pp. 420–422.

C. Dragone, "An N×N Optical Multiplexer Using a Planar Arrangement of Two Star Couplers", *IEEE Photon. Tech. Lett.* 3, 1991, pp. 812–815.

C. Dragone, et al., "Integrated Optics N×N Multiplexer on Silicon", *IEEE Photon. Tech. Lett.* 3, 1991, pp. 896–899.

G. A. Ball and W. W. Morey, "Efficient Integrated $Nd^{3+}$ Fiber Laser", *IEEE Trans. Photon. Tech. Lett.* 3, 1991, pp. 1077–1078.

R. Kashyap, et al., "All-Fibre Narrowband Reflection Gratings at 1500 nm", *Electronics Letters*, 26, 1990, pp. 730–732.

G. A. Ball, et al., "Standing-Wave Monomode Erbium Fiber Laser", *IEEE Photon. Tech. Lett.* 3, 1991, pp. 613–615.

*Primary Examiner*—Léon Scott, Jr.
*Attorney, Agent, or Firm*—M. I. Finston

[57] ABSTRACT

An article, such as an optical communication system, which includes a laser formed in an optical waveguide or optical fiber having a rare-earth-doped core or core portion. In one embodiment, the optical resonant cavity of the laser is at least partially defined by a distributed Bragg reflector formed in a portion of the core. In contrast to the prior art, the length of the optical resonant cavity is about 5 cm or less.

11 Claims, 4 Drawing Sheets

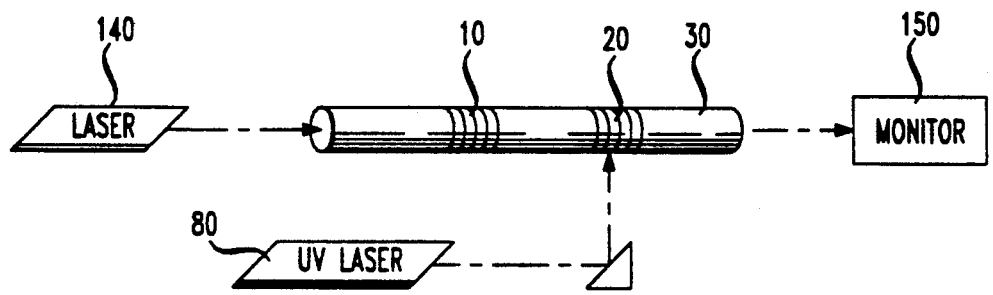
FIG. 4
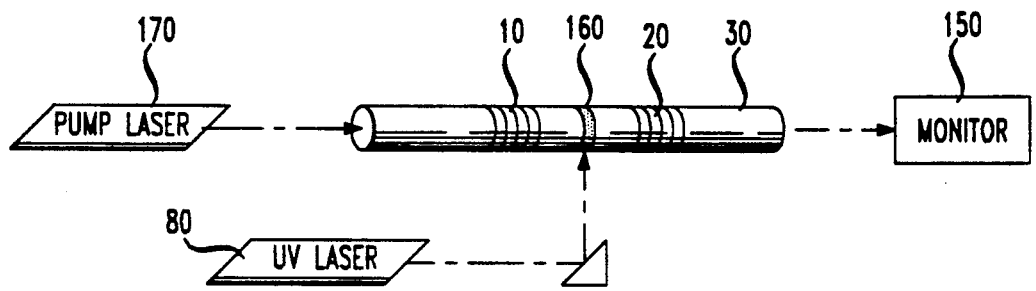
FIG. 5
FIG. 6
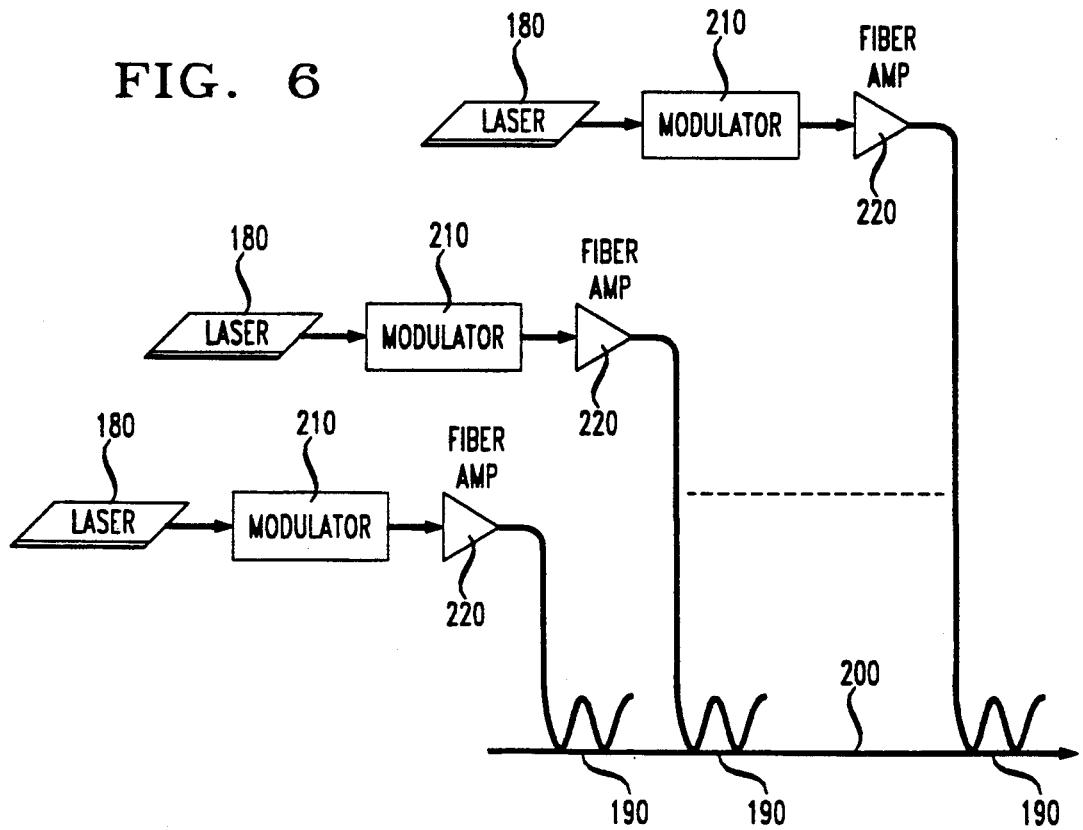

ARTICLE COMPRISING AN OPTICAL FIBER LASER

FIELD OF THE INVENTION

The invention relates to optical fiber lasers, and more particularly, to rare-earth-doped optical fiber lasers in which the optical cavity is at least partially defined by one or more distributed Bragg reflectors formed in the optical fiber.

ART BACKGROUND

An optical fiber laser generally includes an optically active cavity defined in an optical fiber, and reflective means for partially confining electromagnetic radiation within the cavity. By "optically active" is meant that at least a portion of the cavity is doped with a distribution of ions or atoms capable of exhibiting stimulated emission at the desired laser wavelength, when pumped by electromagnetic radiation at a (generally shorter) pump wavelength or range of pump wavelengths. In silica-based optical fibers (i.e., optical fibers having a core which comprises at least 80% silicon dioxide), useful dopants for this purpose are rare-earth ions such as $Er^{+3}$. The reflective means are conveniently provided in the form of at least one, and more typically two, distributed Bragg reflectors (DBRs). DBRs are exemplarily created by exposing an optical fiber having at least some photosensitivity to ultraviolet radiation of an effective wavelength for producing refractive index changes in the fiber. A periodic pattern is imposed on the impinging radiation by, e.g., superimposing a pair of beams of substantially monochromatic radiation to create an interference pattern. When such a patterned radiation field impinges on an optical fiber of the appropriate photosensitivity, a corresponding pattern is imposed on the core of the fiber in the form of periodic (or quasiperiodic) fluctuations in the core refractive index. A technique for creating such reflectors is described in U.S. Pat. No. 4,725,110, issued to W. H. Glenn, et al. on Feb. 16, 1988, and U.S. Pat. No. 4,807,950, issued to W. H. Glenn, et al. on Feb. 28, 1989. An optical filter which comprises a Bragg grating formed in an optical fiber is described in U.S. Pat. No. 5,007,705, issued to W. W. Morey, et al. on Apr. 16, 1991.

Each DBR functions as a wavelength-selective reflector having a reflectance curve (as a function of wavelength) having at least one well-defined peak. The precise wavelength of operation of the laser is determined, at least in part, by the relationship between the modal structure of the cavity and the reflectance curve. That is, for the laser to exhibit gain at a given wavelength (under appropriate stimulation), the given wavelength must not only fall within a reflectance peak, but must also correspond to a Fabry-Perot resonance (i.e., a mode) of the laser cavity.

As is well-known in the art, the spacing between wavelengths corresponding to successive modes increases as the length of the cavity decreases. As a consequence, reducing the cavity length may tend to confine the laser gain to a few modes, or even a single mode. This can result in a laser which has high mode stability. Mode stability is advantageous when, e.g., a source of laser radiation of a precisely defined wavelength is desired.

However, a substantial amount of gain can be preserved in a shortened cavity only by concomitantly increasing the doping level. The doping level cannot be increased indefinitely. One limitation on the doping level is the tendency of dopant ions, such as erbium ions, to aggregate at high concentrations, a phenomenon sometimes referred to as "clustering". Clustering has been associated with parasitic deactivation effects which reduce the efficiency of the laser. We have discovered that, quite surprisingly, a doping level sufficient to impart useful gain to a laser cavity 5 cm long or less can be achieved without suffering an intolerable amount of parasitic loss.

An optical fiber laser having a DBR-terminated cavity is described, e.g., in G. A. Ball and W. W. Morey, "Continuously tunable single-mode erbium fiber laser", *Optics Lett.* 17 (1992) 420–422. Described therein is a single-mode, standing-wave, fiber laser fabricated in germanosilicate fiber doped with erbium to approximately 550 parts per million (ppm). Interfering ultraviolet beams were used to write a pair of DBRs spaced 10 cm apart. The resulting laser was reported to have an optical output power of 100 $\mu$W and a slope efficiency of about 0.25%.

Although successful laser operation has been reported in fiber cavities of 10-cm length or more, practitioners in the field have hitherto failed to provide a useful fiber laser having a substantially shorter cavity, such as a 1-cm cavity. Such a laser is desirable because it can potentially offer enhanced mode stability, as discussed above. Such a short-cavity laser is also desirable because it can facilitate the incorporation of fiber lasers with semiconductor pump lasers in compact packages. Still further, such a laser is desirable because its compact nature reduces its susceptibility to temperature fluctuations and mechanical perturbations.

SUMMARY OF THE INVENTION

We have discovered that successful laser operation can be achieved using an exemplary cavity which is less than about 5 cm in length, and even as small as 2 cm, 1 cm, or even shorter.

Accordingly, the invention, in one embodiment, involves an article which comprises a laser which is embodied in a section of optical fiber including a core and a cladding. The fiber section includes at least one wavelength-selective reflector which at least partially defines an optical resonant cavity, and at least a portion of the core within the cavity is doped with a rare earth. The reflector comprises a pattern of refractive-index modulations extending axially within at least a portion of the core. In contrast to the prior art, the length of the cavity is about 5 cm or less.

BRIEF DESCRIPTION OF THE DRAWINGS

FIG. 4 is a schematic depiction of a method for writing or modifying a DBR in the laser of FIG. 1, with simultaneous transmission monitoring.

FIG. 5 is a schematic depiction of a method for modifying the optical path length within the cavity of the laser of FIG. 1, with simultaneous transmission monitoring.

FIG. 6 is a schematic diagram of an optical wavelength-division multiplexer (WDM) source, incorporating plural fiber lasers of the type illustrated in FIG. 1.

DETAILED DESCRIPTION

Figure 1:
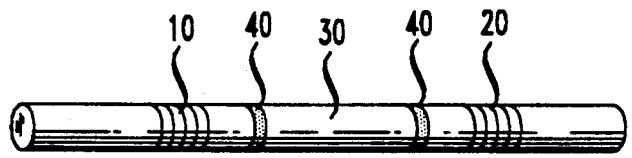
FIG. 1 is a schematic depiction of an optical fiber laser according to the invention.

With reference to FIG. 1, in a currently preferred embodiment, the DBRs 10, 20 are formed in the doped fiber portion 30. This is advantageous because it helps to minimize the total length of the laser device. However, the DBRs are instead, optionally formed in a separate piece of fiber which may, for example, be undoped. Each fiber section incorporating a DBR is then readily joined to the main cavity section by a fusion splice 40.

In an exemplary fiber laser made according to the invention, each DBR was formed by an interference pattern approximately Gaussian in shape, with a full width at half maximum (FWHM) of about 0.5 cm. The nominal, 1-cm length of the cavity was the center-to-center spacing of the exemplary DBRs. The full length of the optical fiber segment in which the cavity was formed was 3 cm. For optical pumping, one end of the laser was optically coupled, via a commercially available, three-terminal optical coupler, to a 980-nm, semiconductor diode laser.

The erbium-doped fiber was made by modified chemical vapor deposition (MCVD) on the inside of a 22 mm×25 mm natural quartz tube to form, in sequence, the cladding and outer core, followed by partial collapse, deposition of the inner core, and collapse to make a preform. The preform was overclad and drawn to form a single-mode optical fiber having an outer diameter of 125 $\mu$m and a core diameter of 2.5 $\mu$m. The techniques used are described, generally, in U.S. Pat. No. 4,666,247, issued to J. B. MacChesney et al. on May 19, 1987. As described in that patent, a mixture of chlorine and helium was used to mobilize volatile metal chlorides and carry them into the reaction zone. The reactant and carrier flow rates in each stage of the MCVD process are listed in Table 1. The reaction zone was heated by a torch having a transverse velocity of 12 cm/minute. The quartz tube was rotated at 60 rpm.

The outer cladding was deposited in 9 layers at 1900° C. The inner cladding was deposited in 2 layers at 1980° C. The outer core was deposited in 6 layers at 1850° C. The quartz tube was then partially collapsed to a 3 mm core diameter. The inner core was then deposited in one layer at 2000° C. During that deposition, the erbium source was an open-ended fused silica ampoule exposed directly to a flow of helium and aluminum trichloride, and heated to 930° C. The aluminum trichloride was generated by flowing helium and chlorine through a bed of aluminum shot at 350° C. (Aluminum trichloride was generated during the growth of both the outer and inner core regions.) After the inner core was deposited, the quartz tube was completely collapsed in one step, overclad, and drawn.

Figure 2:
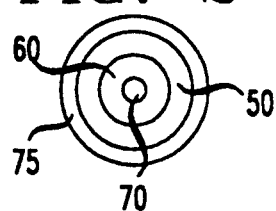
FIG. 2 is a schematic, cross-sectional view of an erbium-doped optical fiber for incorporation in the inventive laser, in one embodiment.

With reference to FIG. 2, the resulting fiber had a fluorine-phosphorus-doped, matched index cladding 50, a germania-alumina-doped outer core 60, and an alumina-erbium-doped inner core 70. The inner core diameter was about 0.3 times the total core diameter. We believe that during the fiber draw, diffusion of both erbium and aluminum took place, and that as a consequence, the outer core also became doped with erbium. Region 75 of the fiber was undoped silica, corresponding to the natural quartz substrate tube and the overcladding tube.

Based on refractive index measurements, we have estimated that the aluminum content created in the inner core region of the preform by the above-described technique was about 20%. (Compositions are specified herein as cation-%, defined as the molar concentration of the cation being specified, divided by the molar concentration of all cations in the glass, including, if applicable, Si, Ge, and Al.) Optical absorption measurements have indicated that the loss attributable to erbium in the core of the fiber at a wavelength of 1530 nm is about 50 dB/m. A uniformly doped core would exhibit that loss at an erbium concentration of about 0.25%. However, that value is only a rough estimate, because, according to our current belief, the erbium distribution is Gaussian rather than uniform.

Figure 3:
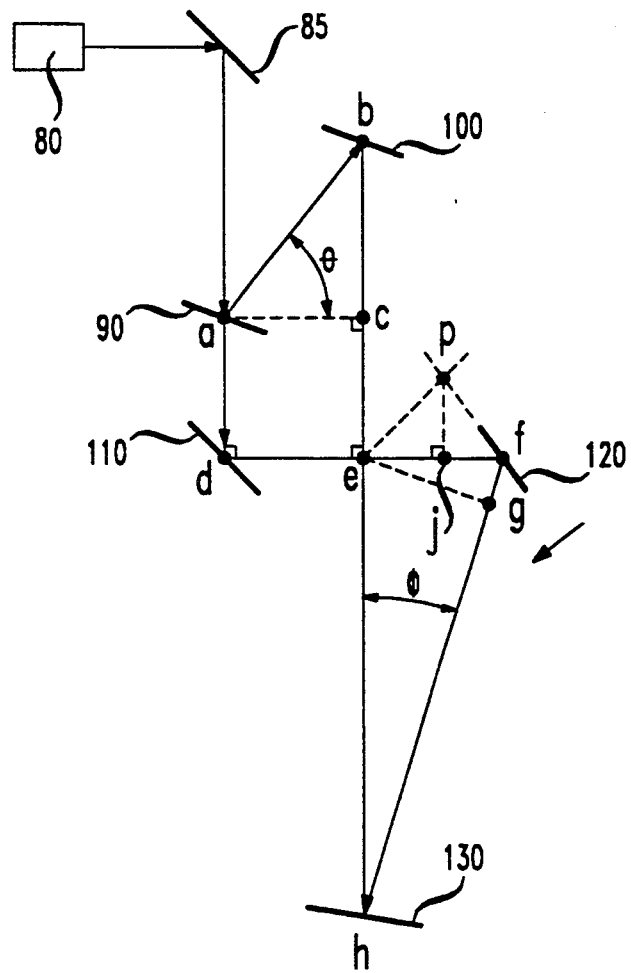
FIG. 3 is a schematic, optical diagram of an interferometric arrangement which is useful for creating the distributed Bragg reflectors (DBRs) of the inventive laser.

As noted, the DBRs were formed in the doped fiber by exposure to an ultraviolet interference pattern. We have found it advantageous to create the interference pattern using a scanning interferometer of a design in which the translation of a single, translatable mirror can shift the position of the interference pattern along the fiber while preserving its registration. As a consequence, the fiber can optionally be kept stationary between the respective exposure steps leading to the formation of the first DBR and the formation of the second DBR. An exemplary such interferometer is described, e.g., in U.S. Pat. No. 4,093,338, issued to G. C. Bjorklund, et al. on Jun. 6, 1978. The optical arrangement of the exemplary interferometer, in one embodiment, is illustrated in FIG. 3. Such optical arrangement includes laser source 80, translatable mirror 85, rotatable mirror 120, and mirrors 90, 100, and 110. The interfering beams converge on photosensitive medium 130. The interference pattern is shifted along the fiber by translating mirror 85. In general, the periodicity of an interference pattern can be changed by adjusting the angle of intersection $\phi$ of the interfering beams. In the exemplary interferometer, this is achieved, without changing the path-length difference between the interfering beams, by rotating mirror 120.

According to a preferred method for making the DBRs, the fiber is first clamped into position to assure that the regions to be exposed and the intervening cavity portion are straight. The fiber is subjected to an effective exposure of ultraviolet radiation. Various appropriate sources of ultraviolet radiation are available and known to those skilled in the art. By way of illustration, we have found that an excimer-pumped, frequency doubled, tunable dye laser emitting at about 240 nm is an appropriate exposure source. We used such a laser to expose the above-described, highly erbium-doped, fiber to 2-mJ pulses at a repetition rate of 20 pulses per second. We used a cylindrical lens to focus the laser light into a band about 0.5 cm long and 100–200 $\mu$m wide. Typical exposures were about 30 seconds in duration.

The period of the DBRs is exemplarily a constant period of about 0.5 μm.

We found that the reflectivity of a given DBR tended to increase with exposure time. We found it useful to produce a DBR having approximately a predetermined reflectivity by monitoring the reflectivity in real time during the ultraviolet exposure, and cutting off the exposure when the desired value was reached.

After the first DBR has been written by ultraviolet exposure, the translatable mirror is translated through a distance corresponding to the cavity length (e.g., 1 cm), and a second exposure is performed to write the second DBR.

Currently preferred reflectivities are about 90% for the DBR which serves as the output coupler, and about 95% for the DBR which serves as the rear reflector.

We have found that a DBR formed as described above can readily be modified by subsequent ultraviolet exposure. For example, a DBR can be overwritten with an interference pattern having, for example, a different periodicity. Moreover, the reflectivity of a DBR can be decreased by exposing it to a single (i.e., non-interfering) ultraviolet beam. Such reduction can be performed during active monitoring of the transmissivity of the cavity or the reflectivity of the DBR, in order to optimize the performance of a given laser. For example, FIG. 4 shows an arrangement in which the transmission of light from source 140 (i.e., a laser, or, preferably, a wider-band source such as an LED) is measured by monitor 150 while the exposure is made by ultraviolet source 80.

We have also found that the optical length of the cavity can be finely adjusted by exposing a small cavity portion 160, between the DBRs, with a single ultraviolet beam. Such a technique is illustrated in FIG. 5. As discussed above, the laser can be limited to single-mode operation by making the cavity sufficiently short. However, the laser power will not be optimized unless the mode coincides with the reflectivity peak of the DBRs. (It should be noted that useful lasers can be made, in which one DBR has a broad peak, and the other DBR has a narrow peak. In such cases, it is the narrow DBR which is important in this context.) Ultraviolet exposure (of a photosensitive medium) will produce a local increase in the refractive index, resulting in an increase in the total optical length of the cavity. As a consequence, the cavity modes may be shifted relative to the reflectivity peak. (Similar adjustments could also be made using an exposure which decreased, rather than increased, the refractive index.) In order to optimize the performance of the laser, the laser output power can be actively monitored while the optical length is adjusted as described. Shown in FIG. 5 is an arrangement in which the fiber laser is pumped by laser 170, and the fiber laser output is measured by monitor 150.

We have found that by using the above-described method of forming DBRs, we can readily form pairs of DBRs which are accurately aligned; i.e., their respective wavelengths of peak reflectivity differ by less than the full width of the DBR reflectivity peak, which is typically about 3 Å. Such accurate alignment is generally needed in order to optimize the performance of the laser. However, the demand for accurate alignment can be relaxed somewhat by making one of the DBRs broader than the other. That is, it is desirable for at least one DBR to have a reflectivity peak width (in the spectral region relevant for lasing) of less than about 3 Å FWHM. However, a useful laser will result if the other DBR has a reflectivity peak which is broader, and even so broad as to effectively contribute no wavelength-selectivity to the functioning of the laser. (It should be noted, however, that it is often desirable to use two DBRs having relatively narrow peaks in order to assure that the laser will have high gain selectivity).

We have found that the width of a DBR can be controlled by controlling the duration of the ultraviolet exposure. Increasing the duration tends to broaden the reflectivity peak of the DBR. Moreover, for weak DBRs (i.e., DBRs which have been formed by exposures of relatively short duration), decreasing the length of the DBR tends to increase the peak width.

We have discovered that the above-described method for making DBRs is highly reproducible. That is, in multiple trials, we have formed DBRs having a single target wavelength of peak reflectivity in ACCUTETHER 220 fiber, a high-index, germanosilicate-core fiber commercially available from AT&T. The peak wavelengths of the resulting DBRs were distributed about the target wavelength with a standard deviation of about 2 Å. Moreover, we currently believe that conventional refinements in our handling techniques will lead to a standard deviation of 0.5 Å or even less, at least in ACCUTETHER 220 fiber and fibers of similar composition.

We have found that at least some lasers made by the above-described method produce output which is not only single-mode in the spectral sense, but also has a single, well-defined polarization. In particular, we found that lasers having cavity lengths of about 1 cm were very likely to have a single mode and a single polarization.

One useful application of optical fiber lasers is in a wavelength-division-multiplexed (WDM) source. A WDM source is a source of electromagnetic radiation of multiple wavelengths, which can be optically coupled into a single optical fiber. Typically, a corresponding multiplicity of single-wavelength lasers is provided, each producing one of the respective wavelengths. A wavelength-division multiplexer (WDM) is used to couple the multiple lasers into the single fiber. Because the DBRs of the inventive laser are highly reproducible, and as a consequence can be economically manufactured to meet close tolerances, the inventive laser provides a useful single-wavelength light source for use in a WDM source having narrow or closely spaced channels.

Wavelength-division multiplexers which are useful for this purpose are known in the art. For example, WDMs which can be fabricated on a silicon substrate are described in C. Dragone, "An N×N Optical Multiplexer Using a Planar Arrangement of Two Star Couplers", *IEEE Photon. Tech. Lett.* 3 (1991) 812–815, and C. Dragone, et al., "Integrated Optics N×N Multiplexer on Silicon", *IEEE Photon. Tech. Lett.* 3 (1991) 896–899.

With reference to FIG. 6, a useful WDM source may include, for example, eight individual, single-wavelength, fiber lasers 180, each optically coupled to a feeder fiber 185 which is coupled by a WDM 190 to a single output fiber 200. An optical modulator 210, e.g. a lithium niobate modulator, is provided to modulate the output from each of the fiber lasers. Incorporated in each of the feeder fibers is a fiber amplifier 220 for amplifying the output from the fiber laser. Alternatively, fiber amplifiers 220 may be replaced by a single amplifier situated downline from WDM 190.

According to our current belief, such a WDM source is capable of providing, e.g., eight communication channels having a center-to-center separation as small as about 5 Å and a channel width of about 2 Å or less.

Figure 7:
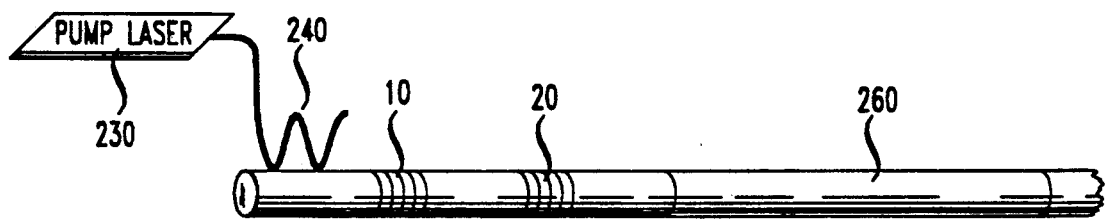
FIG. 7 is a schematic diagram of a portion of an optical communication system, incorporating a laser of the type illustrated in FIG. 1.

With reference to FIG. 7, another useful application of the inventive laser is in an optical communication system. Such a system includes a pump laser 230 optically coupled, via a WDM 240, to a fiber laser 250. The pump laser is exemplarily a semiconductor diode laser emitting at 980 nm or 1480 nm. In response, the fiber laser emits radiation at, e.g., 1550 nm. The emitted laser radiation then passes through a fiber amplifier 260, such as an erbium-doped amplifier.

EXAMPLE I

An optical fiber laser was made substantially as described above. Two DBRs were written in a 3-cm length of erbium-doped fiber made as described above. The center-to-center spacing of the gratings was 1 cm. The laser was pumped by a 980-nm, semiconductor diode laser optically coupled to the fiber laser through a three-terminal wavelength-selective coupler.

Figure 8:
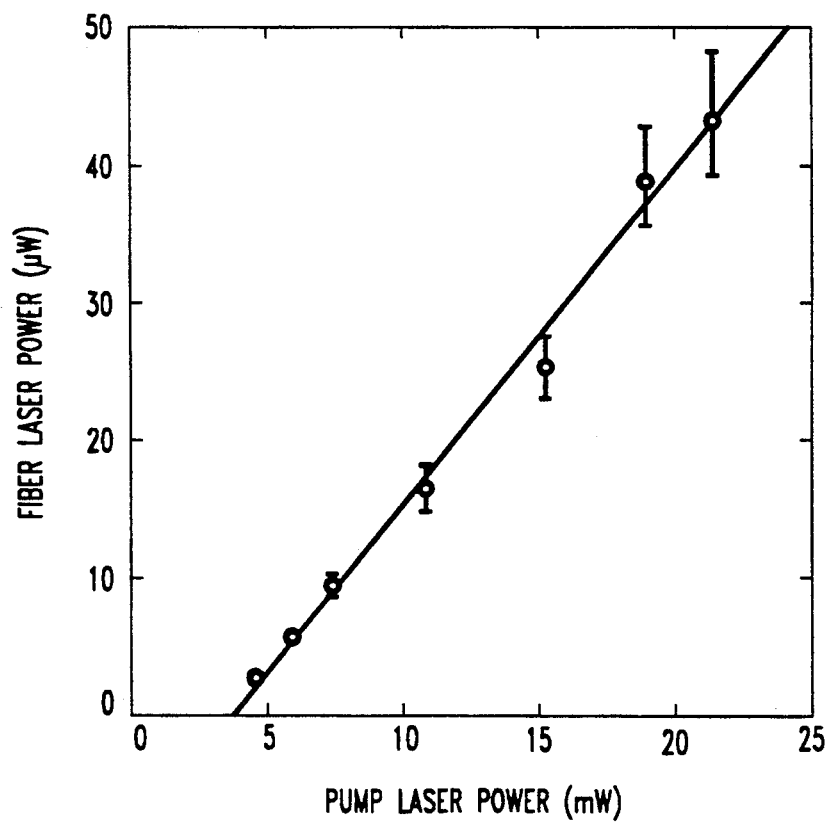
FIG. 8 is a graph of optical output power versus optical pump power for an exemplary laser made according to the invention.

Shown in FIG. 8 is a graph of the output optical power versus the optical pump power of the laser. The fiber laser produced an output optical power of about 50 μW at a pump power of about 24 mW, and exhibited a slope efficiency of about 0.25%. The projected peak output power was greater than 100 μW. The input optical threshold was about 4.4 mW.

Figure 9:
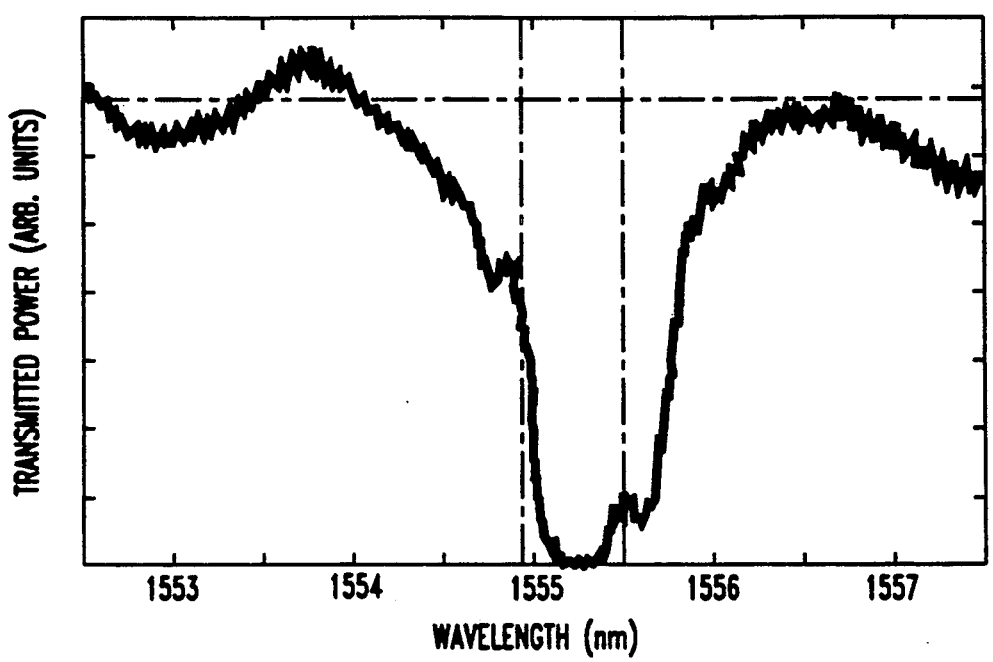
FIG. 9 is a graph of transmissivity versus wavelength for the laser of FIG. 8.

Shown in FIG. 9 is the combined transmission profile of the two DBRs. A composite peak is evident in the figure because each of the two DBRs was formed by multiple ultraviolet exposures.

We have observed relaxation oscillations in fiber lasers made by the above-described method with cavity lengths ranging from 1 cm to 8 cm. We currently believe that these oscillations may be reduced or eliminated by using improved manufacturing techniques to reduce the density of defects in the erbium-doped fiber.

EXAMPLE II

Figure 10:
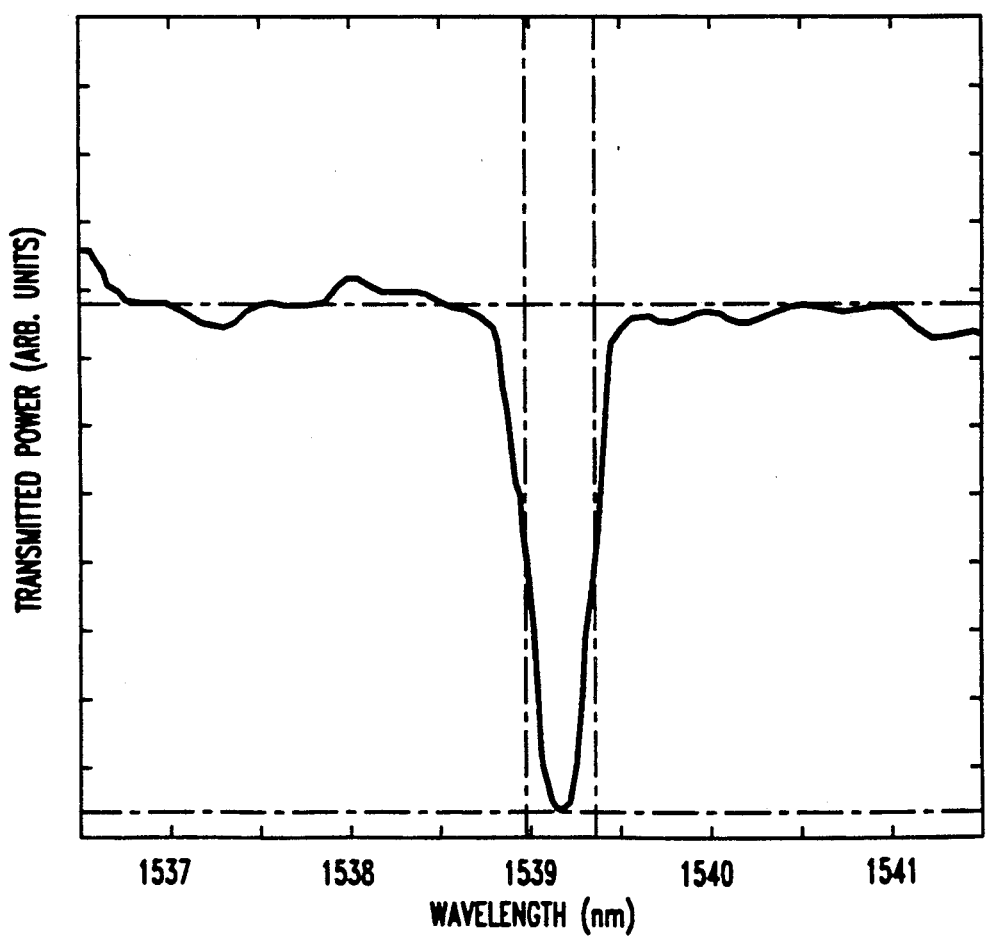
FIG. 10 is a graph of transmissivity versus wavelength for a second, exemplary laser made according to the invention.

An optical fiber laser was made substantially as described above, but with approximately a 2-cm center-to-center separation between the DBRs. Each of the DBRs was written with a single ultraviolet exposure. The combined transmission profile of the two DBRs is shown in FIG. 10. As is apparent in the figure, the combined peak width was about 2.5 Å.

TABLE 1

| Reactant | Outer Cladding | Inner Cladding | Outer Core | Inner Core |
|---|---|---|---|---|
| SiCl$_4$ (g/min.) | 5.6 | 5.6 | 0.6 | 0.15 |
| GeCl$_4$ (g/min.) | 0 | 0 | 0.8 | 0 |
| POCl$_3$ (g/min.) | 0.08 | 0 | 0 | 0 |
| Freon 12 (cm$^3$/min.) | 22 | 60 | 0 | 0 |
| Cl$_2$ (cm$^3$/min.) | 0 | 15 | 1.5 | 45 |
| O$_2$ (cm$^3$/min.) | 1800 | 1800 | 1800 | 600 |
| He (cm$^3$/min.) | 600 | 600 | 300 | 300 |
| Temperature | 1900° C. | 1980° C. | 1850° C. | 2000° C. |

We claim:

1. An article which comprises a first laser, the first laser comprising a section of optical fiber including a core and a cladding, wherein:
  a) the fiber section includes at least one wavelength-selective reflector which at least partially defines an optical resonant cavity of a given length;
  b) the reflector has a wavelength of peak reflectivity;
  c) the reflector comprises a pattern of refractive-index modulations extending axially within at least a portion of the fiber core;
  d) at least a portion of the core within the cavity comprises a rare-earth dopant;
  e) the cavity has an optical path length; and
  f) the optical path length has a first resonant optical wavelength,
  characterized in that
  g) the given cavity length is about 5 cm or less.

2. The article of claim 1, wherein the given cavity length is about 2 cm or less.

3. The article of claim 1, wherein the given cavity length is about 1 cm or less.

4. The article of claim 1, wherein:
  a) the fiber core comprises at least one index-modified region which is situated within the cavity and has an average refractive index which is different from that of at least one adjacent core region within the cavity; and
  b) the average refractive index of the index-modified region is adapted such that the resulting optical path length of the cavity has a resonant wavelength which approximately coincides with the wavelength of peak reflectivity.

5. The article of claim 4, wherein the article is an optical communication system which further comprises:
  a) at least one second laser which comprises a section of optical fiber and emits electromagnetic radiation at a second resonant optical wavelength different from the first resonant optical wavelength;
  b) an optical fiber for signal transmission; and
  c) means for optically coupling the first and second lasers to the transmission fiber.

6. The article of claim 5, further comprising at least first and second means for modulating electromagnetic radiation emitted by the first and second lasers, respectively, each said modulating means situated intermediate the corresponding optical coupling means and a corresponding one of said first and second lasers.

7. The article of claim 1, wherein the rare-earth-doped cavity portion is doped with a concentration of erbium sufficient to produce an output power of about 50 μW of laser light or more from an identically doped laser cavity 1 cm long pumped with an optical input power of about 24 mW.

8. The article of claim 1, further comprising a semiconductor diode laser optically coupled to the fiber section for optically pumping the rare-earth-doped cavity portion.

9. The article of claim 1, wherein the article is an optical communication system which further comprises:
  a) at least one second laser which comprises a section of optical fiber and emits electromagnetic radiation at a second resonant optical wavelength different from the first resonant optical wavelength;
  b) an optical fiber for signal transmission; and
  c) means for optically coupling the first and second lasers to the transmission fiber.

10. The article of claim 9, further comprising at least first and second means for modulating electromagnetic radiation emitted by the first and second lasers, respectively, each said modulating means situated intermediate the corresponding optical coupling means and a corresponding one of said first and second lasers.

11. A method for manufacturing an article, comprising the steps of:
- a) providing a length of optical fiber having a rare-earth-doped, photosensitive core;
- b) exposing a first section of the optical fiber core to a stationary interference pattern formed by intersecting beams of electromagnetic radiation of a wavelength which alters a refractive index of the core, such that a repetitive pattern of refractive index modulations is formed in the first section;
- c) substantially without moving the length of optical fiber, shifting the interference pattern axially relative to the length of optical fiber, such that a second core section physically displaced from the first core section is exposed to the interference pattern; and
- d) exposing the second core section to the interference pattern, such that a repetitive pattern of refractive index modulations is formed in the second section;

characterized in that the method further comprises the steps of:
- e) optically pumping the length of optical fiber such that laser radiation is emitted through the first or second core section;
- f) measuring an intensity of the emitted laser radiation;
- g) comparing the measured intensity to a predetermined threshold value; and
- h) when the measured intensity is less than the threshold value, optically pumping the length of optical fiber such that laser radiation is emitted through the first or second core section; monitoring the intensity of the emitted laser radiation; and while pumping and monitoring, exposing a third core section, intermediate the first and second core sections, to refractive-index-altering radiation for sufficient duration to raise the emitted intensity being monitored to at least the threshold value.